United States Patent
S et al.

(10) Patent No.: US 7,340,484 B2
(45) Date of Patent: Mar. 4, 2008

(54) INTEGRATED CALENDAR

(75) Inventors: Sudhir Krishna S, Bangalore (IN);
Akhilesh Mahto, Bangalore (IN);
Jnana Ranjan Senapati, Bangalore
(IN); Jyothi Kumar R, Bangalore (IN);
Stefan Mueller, Sinsheim (DE)

(73) Assignee: SAP AG, Walldorf, DE (US)

( * ) Notice: Subject to any disclaimer, the term of this patent is extended or adjusted under 35 U.S.C. 154(b) by 498 days.

(21) Appl. No.: 10/879,823

(22) Filed: Jun. 29, 2004

(65) Prior Publication Data

US 2005/0289202 A1 Dec. 29, 2005

(51) Int. Cl.
*G06Q 99/00* (2006.01)

(52) U.S. Cl. .................. 707/104.1; 705/9; 709/204

(58) Field of Classification Search .............. 707/104.1; 705/9; 709/204–206
See application file for complete search history.

(56) References Cited

U.S. PATENT DOCUMENTS

| | | | |
|---|---|---|---|
| 5,129,057 A | 7/1992 | Strope et al. | |
| 5,855,006 A | 12/1998 | Huemoeller et al. | |
| 5,960,406 A | 9/1999 | Rasansky et al. | |
| 6,018,434 A | 1/2000 | Saliba | |
| 6,369,840 B1 | 4/2002 | Barnett et al. | |
| 6,519,763 B1* | 2/2003 | Kaufer et al. | 717/101 |
| 7,082,402 B2* | 7/2006 | Conmy et al. | 705/8 |
| 2004/0003042 A1* | 1/2004 | Horvitz et al. | 709/204 |
| 2004/0039630 A1* | 2/2004 | Begole et al. | 705/11 |
| 2005/0038690 A1* | 2/2005 | Hayes-Roth | 705/9 |

* cited by examiner

*Primary Examiner*—Chong H Kim
(74) *Attorney, Agent, or Firm*—Mintz, Levin, Cohn, Ferris, Glovsky & Popeo, P.C.

(57) ABSTRACT

This document discloses a system and method that assists in collecting, integrating, and displaying calendar data from a plurality of data source applications includes several components. In one implementation, a first client connector communicates with a first client application. A plurality of data source connectors communicate with a plurality of data source applications. Each data source connector communicates with a data source application. An integrator performs multiple functions. It receives a first calendar data request from the first client application through the first client connector. It also retrieves a plurality of calendar data items corresponding to the first calendar data request from two or more of the data source applications through the respective data source connectors. It integrates the plurality of calendar data items into a first integrated calendar data set. And, it transmits the first integrated calendar data set to the first client application through the first client connector.

20 Claims, 6 Drawing Sheets

INTEGRATED CALENDAR

TECHNICAL FIELD

The following description relates to collecting calendar information from multiple applications.

BACKGROUND

Many computer users interact with multiple applications in determining how to schedule their time. For example, a user who wants to schedule a meeting with a colleague might request data from both a groupware service provider to determine a time during which both parties are available and an enterprise resource management server to determine whether conference rooms or necessary equipment are available. As the user requires information from multiple sources, the process by which he or she gathers that information becomes more unwieldy. Suppose a user wanted to set up a business meeting to discuss details of an impending product launch with a representative from his or her company's marketing department, engineering department, legal department, and manufacturing department, one or more of whom are located at different sites. The user would have to check at least (1) the availability of all the participants, (2) multiple milestones related to the product launch such as the dates of trade shows and shipping dates, (3) critical dates for important customers, and (4) collaboration services available at each site during potential meeting times.

In general, computer users may receive information related to time from many different source applications. These source applications include enterprise resource planning (ERP) applications, customer resource management (CRM) applications, supplier relationship management (SRM) applications, corporate Intranets, corporate workflow applications, business-to-business (B2B) commerce applications, the Internet, or Groupware applications (such as Microsoft Outlook or Lotus Domino), among other applications. As a result, users may be required to learn a number of different interfaces and monitor information from each source application separately.

SUMMARY

This document discloses a system and method that assists in collecting, integrating, and displaying calendar data from a plurality of data source applications. The system and method may also apply to other data types like free/busy status, tasks, contacts, e-mail, workflow items, and so on. In one implementation, a first client connector communicates with a first client application. A plurality of data source connectors communicate with a plurality of data source applications. Each data source connector communicates with a data source application. An integrator performs multiple functions. It receives a first calendar data request from the first client application through the first client connector. It also retrieves a plurality of calendar data items corresponding to the first calendar data request from two or more of the data source applications through the respective data source connectors. It integrates the plurality of calendar data items into a first integrated calendar data set. And, it transmits the first integrated calendar data set to the first client application through the first client connector.

One or more of the following features may also be included. For instance, the integrator may include an interface that performs multiple functions. The interface may receive the first calendar data request, translate the first calendar data request into a calendar data item request, and transmit the calendar data item request to one or more of the plurality of data source applications through the respective data source connectors.

In addition, the client applications may come in many configurations. For example, the first client application may include an enterprise resource planning system. The first client application may also include a portal interface to communicate with one or more portals, which may enable a user to actuate calendar data requests and be configured to display integrated calendar data. The portal interface may include a semantic object that is accessible by the portal using a name that semantically suggests the action to be performed by the semantic object. The semantic object may produce, in response to a semantic calendar data request from the portal, a generic calendar data request having one or more parameters that convey information relating to the semantic calendar data request. The portal interface may also include a semantic object provider configured to provide access to prepared semantic objects in response to a semantic calendar data request from the portal. The semantic object provider may be configured to access semantic objects over a remote communication link. The portal interface may also include a repository system that receives the generic calendar data request and communicates the generic calendar data request to the integrator through the first client connector.

Furthermore, more than one client application may be included. For example, the integrator may receive a second calendar data request from a second client application through a second client connector. It may then retrieve a plurality of calendar data items corresponding to the second calendar data request from two or more of the data source applications through the respective data source connectors. The integrator may then integrate the plurality of calendar data items into a second integrated calendar data set. Finally, the integrator may transmit the second integrated calendar data set to the second client application through the second client connector. The first client application may be a portal as described above, and the second client application may be an enterprise resource planning system.

Moreover, communication with the plurality of data source applications may take various forms. For instance, at least one of the data source connectors may communicate with the first data source application through a network such as the Internet. Also, the plurality of data source applications may include a groupware service provider and an enterprise resource planning system.

Advantageously, a user may be able to retrieve and display calendar information from multiple sources. Consequently, a user need not be familiar with multiple user interfaces or navigating through multiple sources to retrieve and display calendar information. Instead, a user may become familiar with a single user interface and with a single set of commands to retrieve and display his or her calendar information. This also saves the user time, and thus money, that would otherwise be spent consulting multiple sources.

The details of one or more implementations of the invention are set forth in the accompanying drawings and the description below. Other features, objects, and advantages of the invention will be apparent from the description and drawings, and from the claims.

DESCRIPTION OF FIGURES

These and other aspects will now be described in detail with reference to the following drawings.

Like reference symbols in the various figures indicate like elements.

DETAILED DESCRIPTION

Figure 1:
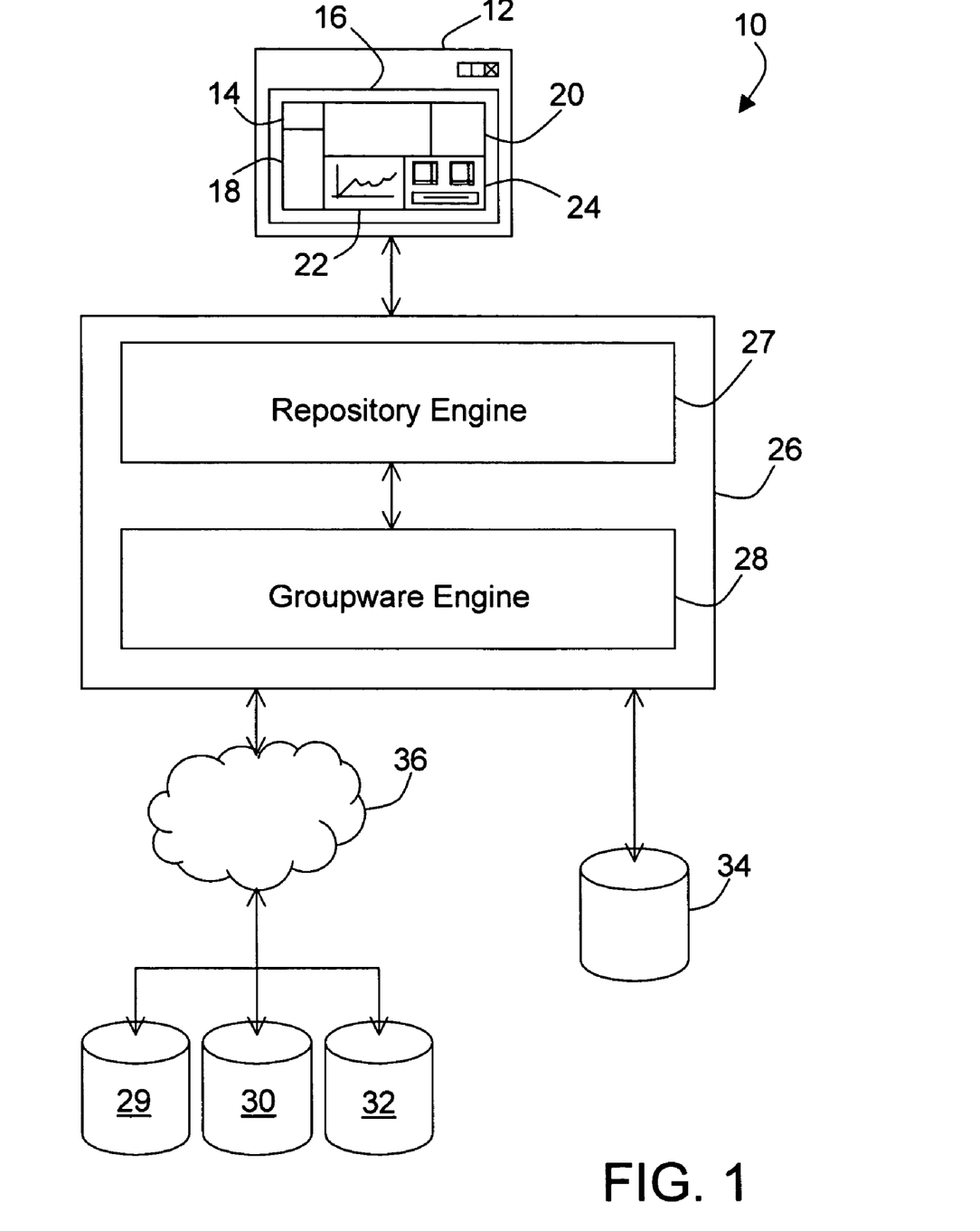
FIG. 1 is a block diagram of a system for managing communications between a computer user and a variety of data source applications.

FIG. 1 shows a system 10 for managing communications between a user and a variety of applications that provide calendar information. In the pictured example, the user interacts with system 10 through a portal 12. Portal 12 is a central interface that provides the user with access to various resources and information, including information that is stored in different formats on different computer systems.

The portal 12 may provide updated information in real-time or near real-time, so that as the underlying data changes, the information displayed in portal 12 also changes. Portal 12 provides this information through various "portlets" or integrated views (also known as "iViews") 14-24. These views can display information from ERP applications, CRM applications, SRM applications, corporate Intranets, corporate workflow applications, B2B commerce applications, the Internet, or groupware applications (such as Microsoft Outlook or Lotus Domino), among other applications.

Portal 12 can be configured to show a variety of views. For example, general view 14 can show updated information regarding industry-specific news headlines, weather, stock prices, or current sales volume in a business, among other things. Also, users may access e-mail through mail view 16.

In addition, some views can be used to show information relating to a collaboration session, such as an e-meeting in which participants can interact with each other synchronously. For example, videoconference view 20 may show video of another user, and portal 12 may also provide corresponding audio. Likewise, presentation view 22 may show a presentation or document that may reside on the user's system or elsewhere, and that may be viewed and annotated by other users in a collaboration session. Videoconference view 20 and presentation view 22 may provide any of a number of features commonly used with electronic meeting and teleconferencing applications. Other collaboration sessions may involve instant messaging, chat, desktop sharing, document sharing, and application sharing, among others.

Other views may be used to present a user with information related to time or scheduling. Calendar view 24 may directly access schedule information stored by a standard calendar tool employed by the user, such as Microsoft Exchange or Lotus Domino. Alternatively, calendar view 24 may provide an area to present a calendar generated by the user's calendar tool. As such, calendar view 24 can serve as a central scheduling tool for the user, or can also serve as an alternative scheduling tool that allows the user to keep a single, common schedule.

As shown, the calendar view 24 displays two months and a list of the two most imminent calendar entries. Other viewing modes are also possible. For example, the viewing mode may include a list of the current day's calendar entries, a set of five or seven columns corresponding to the days of one week, a grid representing one month, or any similar display that a user might find convenient. Additionally, calendar view 24 may display calendar entries in different fonts or colors according to the type of calendar entry. For instance, appointments may be bolded and/or displayed in red while anniversaries may be in plain text or italics and/or displayed in blue. Any combination of font and color display is possible.

Calendar view 24 may also display reminders. For instance, a prompt, which may be accompanied by an audible tone, may be displayed at a predetermined period of time before a meeting is scheduled to occur. The prompt may include a link to the corresponding appointment, providing the user with details of the meeting's location and participants, as well as a copy of the documents or materials to be discussed at the meeting. The prompt may also include a "snooze button," which allows the user to set the prompt to be displayed again after a chosen period of time.

Users may also set up proposed collaboration sessions through the calendar view 24. For example, a user may determine a time during which all prospective attendees are free. The user may then send collaboration session invitations by e-mail to those prospective attendees. The invitations may include time and location details, whether the session will occur once or on a recurring basis, an agenda or other notes, and documents or URL links. After the invitations are sent, the user can also track the prospective attendees' responses through the calendar view 24.

Many additional portal 12 implementations are possible. For instance, there may be a greater or lesser number of iViews 14-24 than shown. Additionally, the iViews 14-24 may be differently sized and/or arranged than shown.

The portal 12 may communicate with an integration system 26. In a simple system, the portal 12 may request data directly from an application. In such a case, the request would be made in the protocol, or set of rules, that is understood by that application. In a complex system, however, such as an organization-wide ERP system, other components may be provided between the portal 12 and the application to provide compatibility between the portal 12 and the application.

The integration system 26 may perform at least two functions. First, it may enable the portal 12 to generate a calendar information request that only needs to contain a few relatively intuitive parameters. The integration system 26 may translate the request, adding the parameters that an application would need to be able to process the request. This allows developers of portals to create functionality in a much simpler fashion. This function may be performed by a repository engine 27, which is described in further detail in conjunction with FIGS. 2-3.

Portals 12 may communicate with the integration system 26 directly or indirectly, such as through a network. The network may be a LAN or a WAN. Additionally, multiple portals 12 may communicate with a single integration system 26. In such a situation, one or more portals 12 may communicate directly with the integration system 26 and one or more portals 12 may communicate indirectly with the integration system 26. The integration system's 26 ability to enable the portal 12 to generate a semantic calendar request will be discussed in more detail in conjunction with FIGS. 2-3.

A second function that the integration system 26 may perform is retrieving calendar information from multiple back-end applications 29-34, merging the calendar information together into one communication or into multiple reformatted communications, and sending that communication or those communications back to the application that requested it. This relieves the user from retrieving the calendar information from each back-end application 29-34 individually. A groupware engine 28 may perform this function.

The integration system 26 may communicate with one or more back-end applications 29-34 directly or indirectly, such as through a network. The network may be the Internet 36. In a case of multiple back-end applications 29-34, one or more back-end applications 29-34 may communicate directly with the integration system 26 and one or more back-end applications 29-34 may communicate indirectly with the integration system 26. The integration system's 26 ability to provide merged calendar data to the portal 12 will be discussed in more detail in conjunction with FIGS. 4-5.

Figure 2:
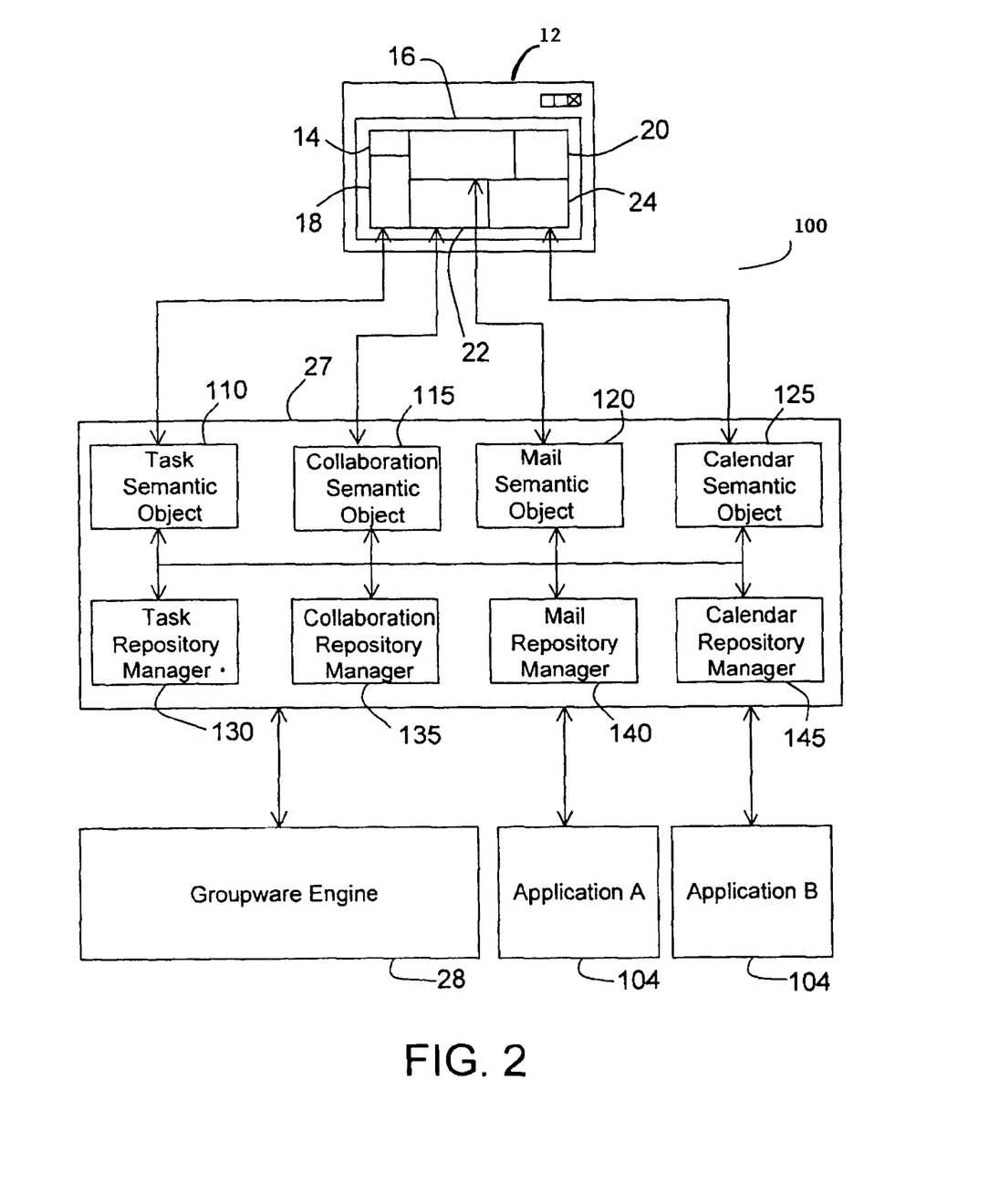
FIG. 2 is a more detailed block diagram of one object depicted in FIG. 1.

FIG. 2 shows a portal communication system 100 for enabling a portal 12 to communicate with a groupware engine 28 and/or one or more applications 104. The portal 12, as described in conjunction with FIG. 1, may contain several iViews, each of which may permit a user to request information from or write information to storage.

The repository engine 27 may include semantic object providers 110-125 and repository managers 130-145. Semantic objects 110-125 can create an intuitive programming environment for designers of portal software. Such designers need only transmit requests containing one or more relatively intuitive parameters to the semantic objects 110-125. The semantic objects 110-125 may then add additional parameters to create requests that can be received and responded to by various applications. Such parameters may include information to allow the applications to locate the requested information. These additional parameters make generic requests more complicated and less intuitive than semantic requests for a developer of a portal 12. Thus, by providing that the portal communication system 100, rather than the developer, provide the additional parameters, portal communication system 100 makes the programming environment much more understandable. As a result, a developer using semantic objects 110-125 can learn such a system more easily, will not have to type as much code, and will be less likely to make errors in the code.

The semantic objects 110-125 may transmit such generic requests to corresponding repository managers 130-145. The repository managers 130-145 may be responsible for directing the generic requests to applications that may be able to respond to those requests. Those applications may include a groupware engine 28, which is discussed in further detail in conjunction with FIG. 4, and other applications 104 such as any of the applications listed above. This generic request may be made by any number of different methods, and generally is not dependent on, nor does it affect, the manner in which the semantic objects 110-125 operate.

The repository engine 27 may include semantic objects 110-125 and repository managers 130-145 that correspond to different iViews 16-24. For example, as shown, the task view 18 communicates with a task semantic object 110; the presentation view 22 communicates with a collaboration semantic object 115; the mail view 16 communicates with a mail semantic object 120; and the calendar view 24 communicates with a calendar semantic object 125. Additionally, each of the semantic objects 110-125 may communicate with a respective repository manager 130-145: the task semantic object 110 with a task repository manager 130; the collaboration semantic object 125 with a collaboration repository manager 135; the mail semantic object 120 with a mail repository manager 140; and the calendar semantic object 125 with a calendar repository manager 145.

Figure 3:
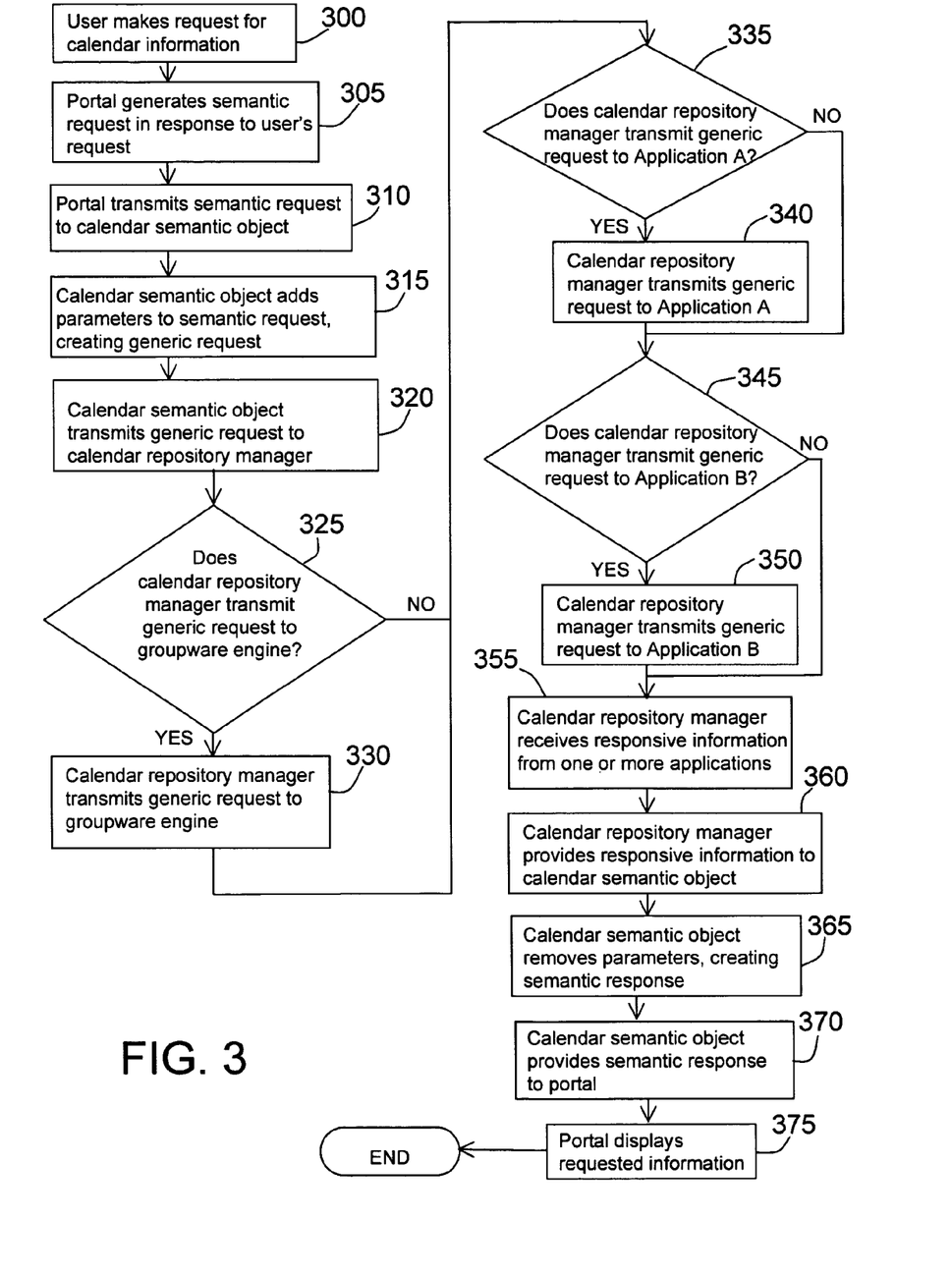
FIG. 3 is a flow chart illustrating a method of using the portal communication system 200 of FIG. 2 to display calendar information pursuant to a user's request.

FIG. 3 is a flow chart illustrating a method of using a portal communication system 100 of FIG. 2 to display calendar information pursuant to a user's request. To begin, a user makes a request for calendar information (300). In response to that request, a portal generates a semantic request (305). The following exemplary code illustrates such a semantic request:

```
ICalendarSO calSOs[] =
    GWUtils.getAllCalendarItems(((IPortalComponentRequest)
    this.getRequest( )).getUser( ),strRoot);
```

The portal then transmits the semantic request to the calendar semantic object (310). The calendar semantic object adds parameters to the semantic request to create a generic request (315). The following exemplary code illustrates a generic request to retrieve all appointments for "/calendar/day/20040416":

```
IResource res = ResourceFactory.getInstance( ).getResource(new
    RID("/calendar/day/20040416"),rContext);
```

The calendar semantic object then transmits the generic request to the calendar repository manager (320). Then, the calendar repository manager makes several determinations concerning where to direct the generic calendar request. The calendar repository manager determines whether to transmit the generic request to the groupware engine (325). If the calendar repository manager determines that the generic request should be transmitted to the groupware engine, the calendar repository manager does so (330). Either way, the calendar repository manager determines whether to transmit the generic request to Application A (335). If the calendar repository manager deems it proper to transmit the generic request to the groupware engine, the calendar repository manager does so (340). Whether or not the calendar repository manager decides to transmit the generic request to the groupware engine or Application A, the calendar repository manager determines whether to transmit the generic request to Application B (345). If the calendar repository manager decides to transmit the generic request to Application B, the calendar repository manager does so (350).

After the calendar repository manager finishes transmitting the generic request to the appropriate applications, the calendar repository manager receives responsive information from one or more of the applications (355). The calendar repository manager then provides the responsive information to the calendar semantic object (360). The calendar semantic object removes parameters to create a semantic response that the portal is able to process (365). The following exemplary code illustrates how the calendar semantic object converts a generic response—Iresourceltem—into a semantic response—IcalendarItem:

```
IResource res = obj;
ICalendarItem calendarItem=null;
if (res instanceof CalendarResourceImpl) {
    calendarItem = ((CalendarResourceImpl) res).getCalendarItem( );
}
// wait for processing
return calendarItem;
```

The calendar semantic object then transmits the semantic response to the portal (370). The portal is then able to display the requested information (375). This method allows the user to access information from multiple sources by entering a relatively simple calendar data request.

Although this implementation has been described as having four distinct components for each communication—a portal, a semantic object, a repository manager, and at least one data source—the portal communication system may be arranged in any appropriate manner. For example, two or more of the components could be combined, or additional components could be provided. In addition, the order of, and interrelationships between, the various components could be rearranged. As one example, the responsive message would not have to follow a path through all of the components before reaching the portal 12.

Figure 4:
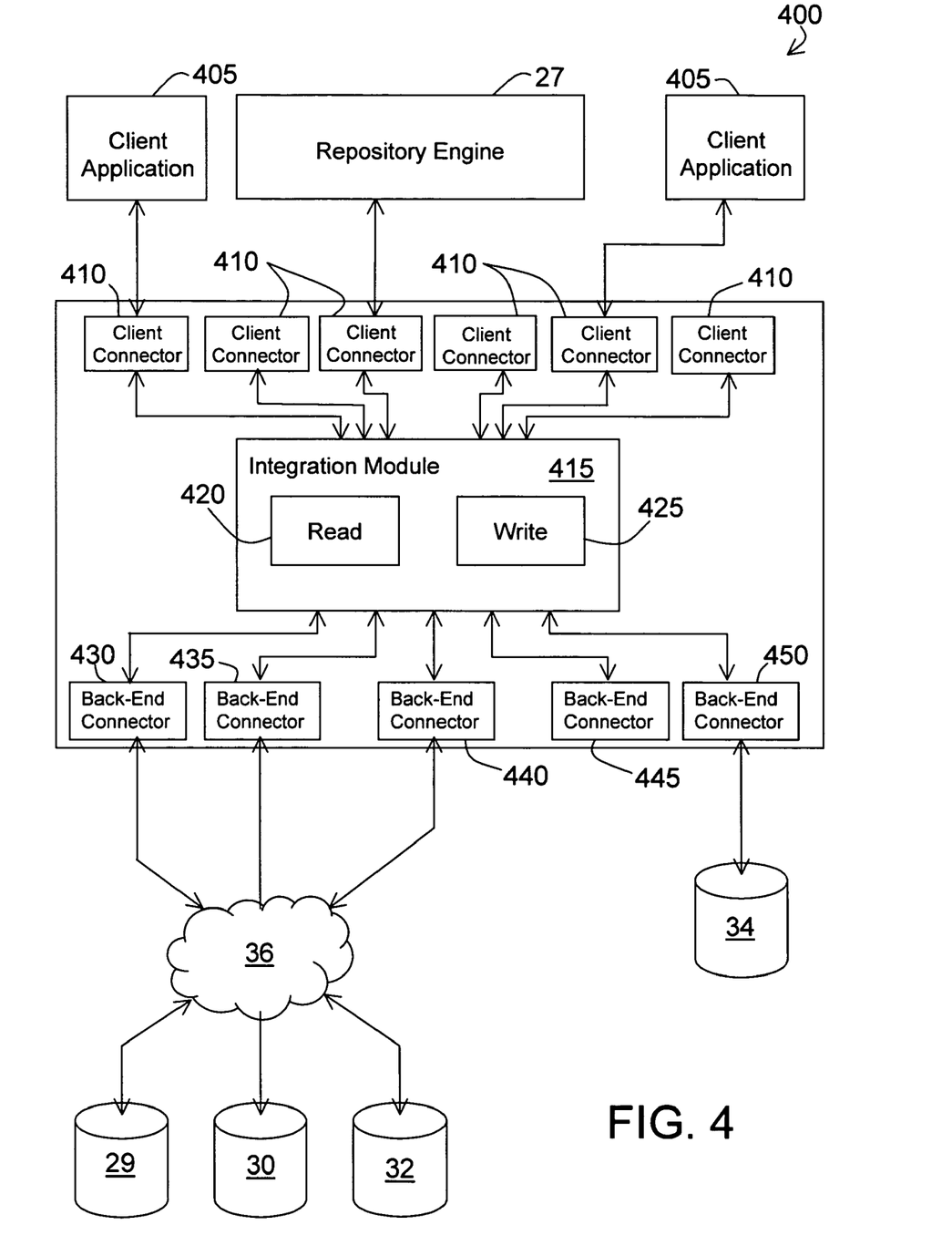
FIG. 4 is a more detailed block diagram of a different object depicted in FIG. 1.

FIG. 4 shows a data source abstraction system 400 for communicating between one or more client applications and one or more back-end applications 29-34. The client applications may include a repository engine 27 and other miscellaneous client applications 405. The repository engine 27 may be configured in any of the ways described in conjunction with FIG. 2. Miscellaneous client applications 405 may be any kind of application that requests calendar information. In fact, an application may be both a client application and a back-end application.

The repository engine 27 and the miscellaneous client applications 405 may communicate with a groupware engine 28 through respective client connectors 410. A client connector 410 is a software object designed to enable simple interoperability between client applications and the groupware engine 28. Client connectors 410 enable developers of client applications to focus on the primary functionality of the client application rather than spending time and money trying to make sure the client application can interact with every conceivable application with which the client application may eventually interact. Once the developer creates the primary functionality, others can create the object that allows for interoperability. The client connectors 410 translate or convert communications from the repository engine 27 and miscellaneous applications 405 so that the groupware engine 28 can understand the communications. The following exemplary code illustrates such a translation or conversion:

```
ICalendarItem calendarItem =(ICalendarItem)
    groupwareManager.getItem(GroupwareItemType.CALENDAR,
    "MSExchangeTransport", meetingId, user);
```

Once the client connectors 410 translate the communications, the client connectors 410 forward those communications to an integration module 415, which may include a read module 420 and a write module 425. The read module 420 may be responsible for handling and responding to requests to retrieve information from back-end applications 29-34. The write module 425 may be responsible for handling and responding to requests to send information to back-end applications 29-34.

The integration module 415 receives the communication, analyzes it, and determines which back-end application(s) 29-34 could respond to it. Once the integration module 415 selects one or more appropriate back-end applications, the integration module 415 sends the communications to back-end connector(s) 430-450. Each back-end connector 430-450 corresponds with a selected back-end application 29-34. The back-end connector 430-450 performs a function similar to that of the client connectors 410. Namely, each back-end connector 430-450 translates or converts communications into a format that the corresponding back-end application 29-34 can understand, and then forwards the translated or converted communication to the back-end application 29-34. This process may be achieved by creating a query URL and then executing the query on the system of the back-end application 29-34. The following exemplary code illustrates the process:

```
StringBuffer stringUrl = new StringBuffer("http://");
stringUrl.append(server);
stringUrl.append(this.COLON);
stringUrl.append(port);
stringUrl.append("/calendar.asp?");
//add query parameters like start date and end date to URL
url = new URL(stringUrl.toString( ));
urlConnection = getHttpURLConnection(url, authorization);
//execute the URL and obtain the data from the back-end application
returnValue = urlConnection.getInputStream( );
```

Figure 5A:
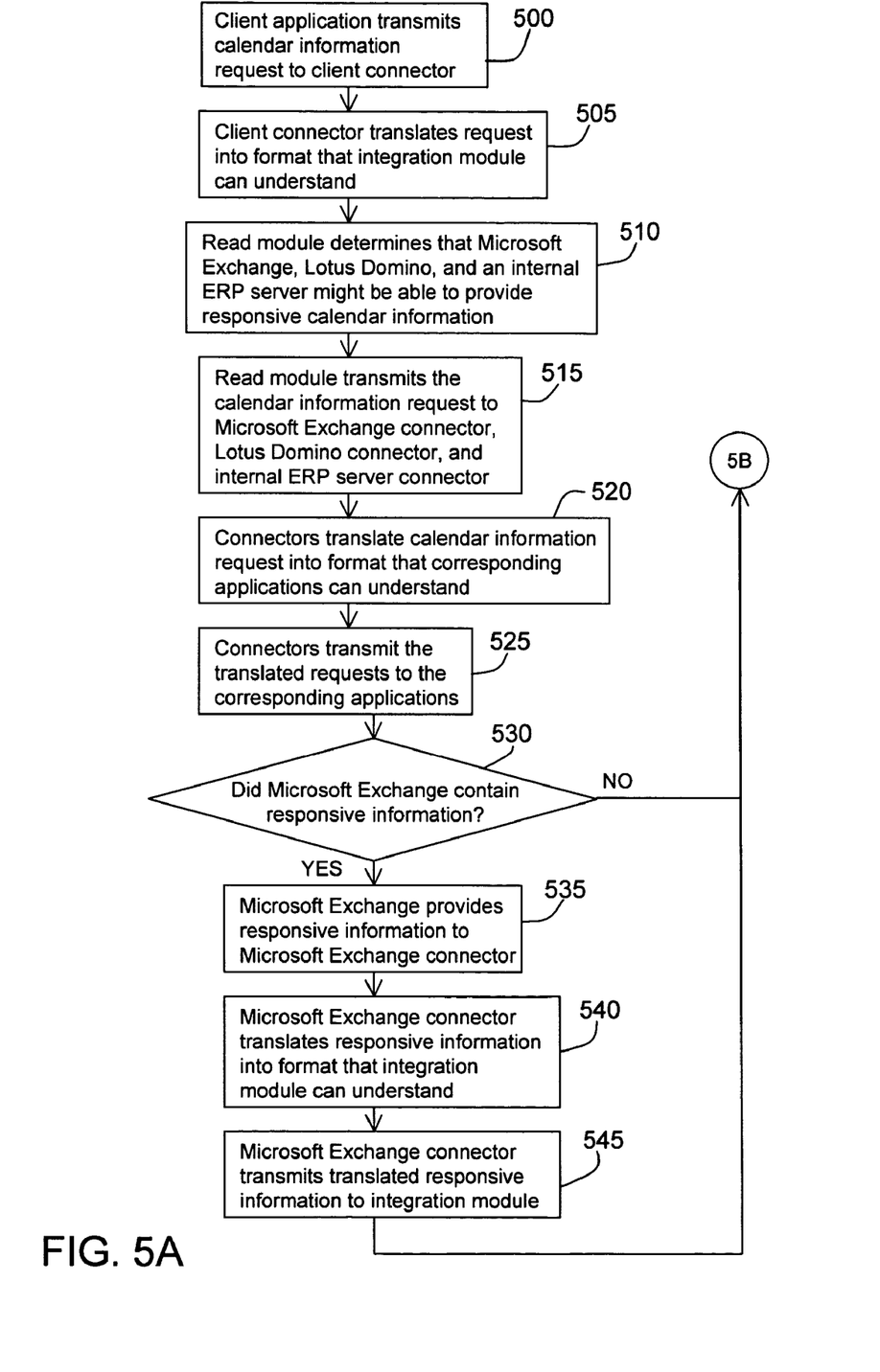
FIGS. 5A and 5B are a flow chart providing an example of how a client application might retrieve integrated calendar information from back-end applications using the data abstraction system of FIG. 4.
Figure 5B:
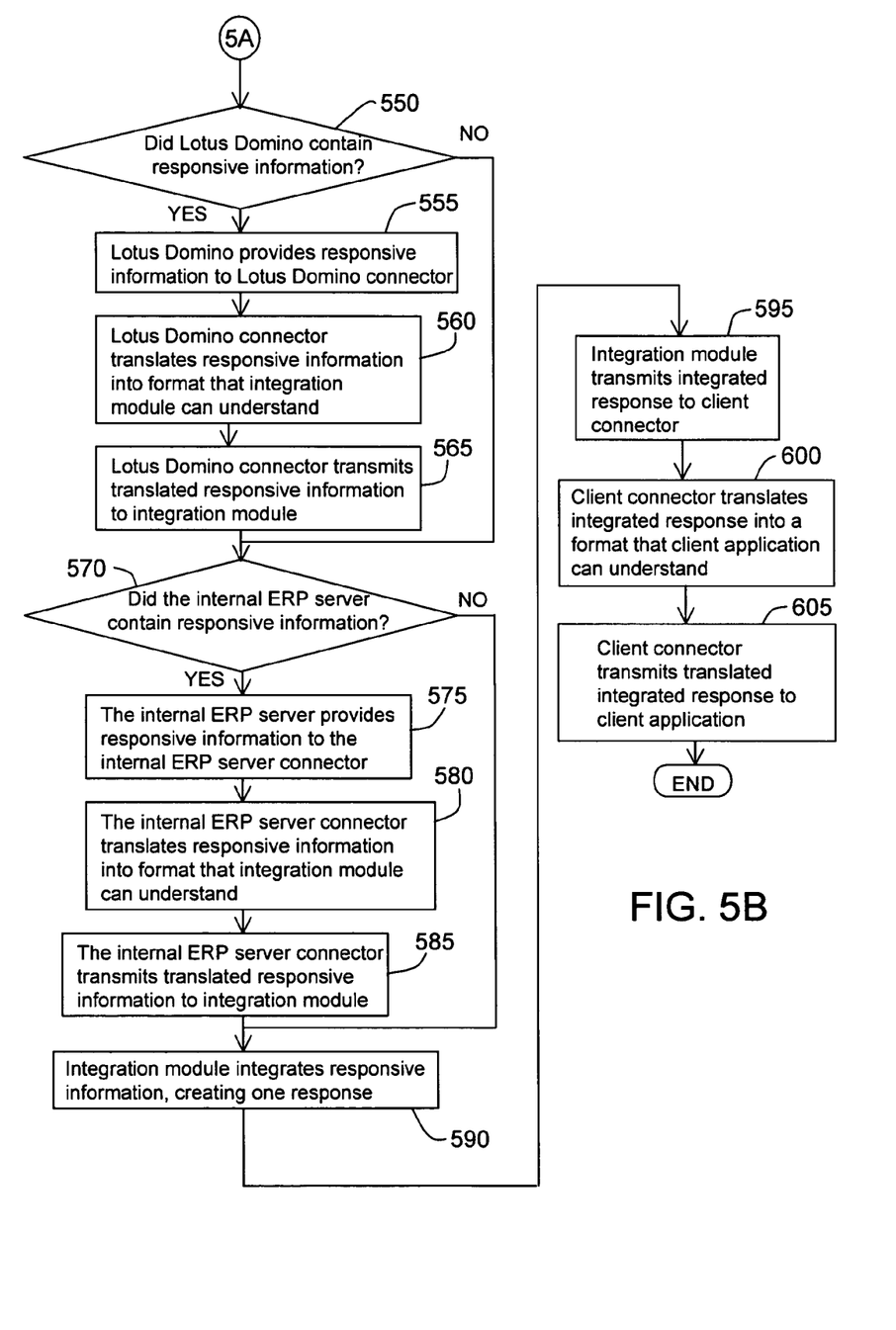

FIGS. 5A and 5B are a flow chart providing an example of how a client application might retrieve integrated calendar information from back-end applications using the data abstraction system 400 of FIG. 4. In FIGS. 5A and 5B, are the client application may first transmit a calendar information request to the corresponding client connector (500). Then the client connector may translate the calendar information request into a format that the integration module can understand (505), as shown in the exemplary code above.

The integration module's read module analyzes the calendar information request and determines which back-end applications may contain information responsive. As shown, the read module determines that Microsoft Exchange, Lotus Domino, and an internal ERP server might contain responsive information (510). The read module transmits the calendar information request to the Microsoft Exchange connector, the Lotus Domino connector, and the internal ERP server connector (515). The respective back-end connectors then translate the calendar information request into a format that is specific to the corresponding applications (520). The back-end connectors then transmit the translated requests to the corresponding applications (525), as shown in the exemplary code above.

Once the corresponding applications receive the calendar information request, they must determine whether they have information responsive to the request (530, 550, 570). If those applications contain responsive information, they transmit the responsive information back to the corresponding back-end connectors (535, 555, 575). The corresponding back-end connectors translate the responsive information into a format that the integration module can understand (540, 560, 580). In the following exemplary code, the back-end connectors use HTTPStream to retrieve the data in an XML format and convert it to an ICalendarItem format that the integration module can understand:

```
InputStream xmlStream =
connection.getHttpConnectionStream
(l_authorization,parameters.toString( ),EXE
CUTECALENDAR);
ICalendarItem calendarItem = getCalendarItem(xmlStream);
```

The back-end connectors then transmit the translated responsive information back to the integration module (545, 565, 585).

Assuming at least two of the three back-end applications provided responsive information, the integration module then integrates the responses, creating one response (590). In the following exemplary code, the integration module loops through all the configured data sources, called "transports," and creates one response data structure:

```
while (transports.hasNext( )) {
    readTransport = (IReadTransport) transports.next( );
    String serverAlias = readTransport.getServerAlias( );
    IGroupwareCredentials credentials =
GroupwareCredentialsFactory.getCredentials(user, serverAlias);
    //read the items from the transport for the specified date range
    List list = readTransport.getItemList(range, credentials);
    setReferenceOnItems(list, readTransport);
    result.addAll(list);
}
```

The integration module then transmits the integrated response back to the client connector (595), which translates the integrated response back to a format specific to the client application that requested the calendar information (600). The client connector then transmits the translated response back to the client application (605).

Although the implementation shown in block form in FIG. 4 and in flow chart form in FIGS. 5A and 5B has been described as having five distinct components for each communication—a client application, a client connector, an integration module, at least one back-end connector, and at least one back-end application—the data source abstraction system may be arranged in any appropriate manner. For example, two or more of the components could be combined, or additional components could be provided. In addition, the order of, and interrelationships between, the various components could be rearranged. As one example, the communication from the client application to the back-end application need not follow the same path as the communication from the back-end application to the client application.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or module-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A system for integrating calendar data from a plurality of data source applications, comprising:
   a processor and a memory storing instructions that, when executed by the processor, implement:
   a first client connector configured to receive a calendar data request from a first client application and convert and/or translate the calendar data request between a first client application format and an integrator format;
   a plurality of data source connectors, each configured to communicate with corresponding data source application by converting and/or translating between the integrator format and a format of the corresponding data source application; and
   an integrator to receive a first calendar data request from the first client application through the first client connector, to retrieve a plurality of calendar data items corresponding to the first calendar data request from two or more of the data source applications through the respective data source connectors, to integrate the plurality of calendar data items into a first integrated calendar data set, and to transmit the first integrated calendar data set to the first client application through the first client connector.

2. The system of claim 1, wherein the integrator further comprises an interface to receive the first calendar data request, to translate the first calendar data request into a calendar data item request, and to transmit the calendar data item request to one or more of the plurality of data source applications through the respective data source connectors.

3. The system of claim 1, wherein the first client application comprises a portal interface to communicate with a portal, the portal being configured to enable a user to actuate calendar data requests and being configured to display integrated calendar data.

4. The system of claim 3, wherein the portal interface is configured to communicate with a plurality of portals, each portal being configured to enable a user to actuate calendar data requests and being configured to display integrated calendar data.

5. The system of claim 3, wherein the portal interface comprises:
a semantic object that is accessible by the portal using a name that semantically suggests the action to be performed by the semantic object, the semantic object producing, in response to a semantic calendar data request from the portal, a generic calendar data request having one or more parameters that convey information relating to the semantic calendar data request; and
a repository system that receives the generic calendar data request and communicates the generic calendar data request to the integrator through the first client connector.

6. The system of claim 1, wherein the first client application comprises an enterprise resource planning system.

7. The system of claim 1, further comprising a second client connector configured to communicate with a second client application, the second client connector being implemented on the processor, the second client connector converting and/or translating the calendar data request between a second client application format and the integrator format, the second client application being different than the first client application, wherein the integrator is configured to receive a second calendar data request from the second client application through the second client connector, to retrieve a plurality of calendar data items corresponding to the second calendar data request from two or more of the data source applications through the respective data source connectors, to integrate the plurality of calendar data items into a second integrated calendar data set, and to transmit a the second integrated calendar data set to the second client application through the second client connector.

8. The system of claim 7, wherein the second client application comprises a portal interface to communicate with a portal, the portal being configured to enable a user to actuate calender data requests and being configured to display the integrated calendar data, and wherein the second client application comprises an enterprise resource planning system.

9. The system of claim 1, wherein the plurality of data source applications comprise a groupware service provider and an enterprise resource planning system.

10. The system of claim 1, wherein one or more of the data source connectors communicate with the corresponding data source application through a network.

11. A computer-implemented method of integrating calendar data from a plurality of data source applications, the method comprising:
receiving a calendar data request from a first client application via a first client connector implemented on a processor, the first client connector converting and/or translating the calendar data request between a first client application format and an integrator format;
retrieving a plurality of calendar data items corresponding to the first calendar data request from a plurality of data source applications, via a plurality of data source connectors, each of the plurality of data source connectors being implemented on the processor and communicating with one of the plurality of source applications, each of the data source connectors converting and/or translating between the integrator format and a format of the corresponding data source application;
integrating the plurality of calendar data items into a first integrated calendar data set; and
transmitting the first integrated calendar data set to the first client application via the first client connector.

12. The computer-implemented method of claim 11, wherein the first client application comprises a portal interface to communicate with a portal, the portal being configured to enable a user to actuate calendar data requests and being configured to display integrated calendar data.

13. The computer-implemented method of claim 12, wherein the portal interface is configured to communicate with a plurality of portals, each portal being configured to enable a user to actuate calendar data requests and being configured to display integrated calendar data.

14. The computer-implemented method of claim 12, wherein the portal interface comprises:
a semantic object that is accessible by the portal using a name that semantically suggests the action to be performed by the semantic object, the semantic object producing, in response to a semantic calendar data request from the portal, a generic calendar data request having one or more parameters that convey information relating to the semantic calendar data request; and
a repository manager that receives the generic calendar data request and transmits the generic calendar data request.

15. The computer-implemented method of claim 11, wherein the first client application comprises an enterprise resource planning system.

16. The computer-implemented method of claim 11, further comprising:
receiving a second calendar data request from a second client application via a second client connector implemented on the processor, the second client connector converting and/or translating the calendar data request between a second client application format and the integrator format, the second client application being different from the first client application;
retrieving a plurality of calender data items corresponding to the second calender data request from the plurality of data source applications;
integrating the plurality of calendar data items into a first integrated calendar data set; and
transmitting the first integrated calendar data set to the second client application via the second client connector.

17. The computer-implemented method of claim 16, wherein the second client application comprises a portal interface to communicate with a portal, the portal being configured to enable a user to actuate calendar data requests and being configured to display integrated calendar data, and wherein the second client application comprises an enterprise resource planning system.

18. The computer-implemented method of claim 11, wherein the plurality of data source applications comprise a groupware service provider and an enterprise resource planning system.

19. The computer-implemented method of claim 11, wherein communication with at least one of the data source applications is through a network.

20. A computer-implemented method comprising:

receiving, by a client connector, a calendar data request from a client application, the client connector converting the calendar data request from a client application format to an integration module format that is readable by an integration module;

determining which of a plurality of back-end applications contains data corresponding to the calendar data request, the plurality of back-end applications comprising at least two different data storage formats;

initiating, by at least two back-end connectors, transmission of the calendar data request to at least two of the plurality of back-end applications, each back-end connector corresponding to one of the plurality of back-end applications, each back-end connector converting the calendar data request to a back-end format compatible with its corresponding back-end application, the at least two back-end applications using different formats;

receiving, by the at least two back-end connectors, information responsive to the calendar data request from the at least two of the plurality of back-end applications, the back-end connectors converting the information to the integration module format;

integrating, in the integration module, the information from the at least two back-end applications into an integrated calendar data set; and initiating transmission, by the client connector, of the integrated calendar data set to the client application, the client connector converting the integrated calendar data set into the client application format.

* * * * *